US012687485B2

(12) United States Patent
Tuchman et al.

(10) Patent No.: US 12,687,485 B2
(45) Date of Patent: Jul. 21, 2026

(54) BONDING ENERGY MEASUREMENT

(71) Applicant: Tokyo Electron Limited, Tokyo (JP)

(72) Inventors: Andrew Tuchman, Albany, NY (US);
Ilseok Son, Albany, NY (US)

(73) Assignee: Tokyo Electron Limited, Tokyo (JP)

( * ) Notice: Subject to any disclaimer, the term of this patent is extended or adjusted under 35 U.S.C. 154(b) by 157 days.

(21) Appl. No.: 18/617,287

(22) Filed: Mar. 26, 2024

(65) Prior Publication Data

US 2025/0305935 A1      Oct. 2, 2025

(51) Int. Cl.
| | |
|---|---|
| *G01N 19/04* | (2006.01) |
| *G01B 9/02015* | (2022.01) |
| *G01N 21/59* | (2006.01) |
| *G01N 21/88* | (2006.01) |
| *G01N 21/95* | (2006.01) |
| *G01N 21/17* | (2006.01) |

(52) U.S. Cl.
CPC ......... *G01N 19/04* (2013.01); *G01B 9/02024* (2013.01); *G01N 21/59* (2013.01); *G01N 21/8806* (2013.01); *G01N 21/9505* (2013.01); *G01N 2021/177* (2013.01); *G01N 2021/8812* (2013.01); *G01N 2201/0618* (2013.01)

(58) Field of Classification Search
CPC .... G01N 19/04; G01N 21/59; G01N 21/8806; G01N 21/9505; G01N 2021/177; G01N 2021/8812; G01N 2201/0618; G01N 2203/0066; G01N 2203/0064; G01N 3/24; G01B 9/02024; H01L 21/67288; H01L 21/68707
See application file for complete search history.

(56) References Cited

U.S. PATENT DOCUMENTS

| | | | |
|---|---|---|---|
| 10,093,086 | B2 | 10/2018 | Landru et al. |
| 10,823,682 | B2 | 11/2020 | Sugiura et al. |

(Continued)

FOREIGN PATENT DOCUMENTS

| | | |
|---|---|---|
| CN | 1648632 A | 8/2005 |
| CN | 108039327 A | 5/2018 |

(Continued)

OTHER PUBLICATIONS

Yang et. "Organic-Inorganic Solid-State Hybridization with High-Strength and Anti-Hydrolysis Interface", Sci. Rep. 9: 504 (2019).*

(Continued)

*Primary Examiner* — Mohamed K Amara
(74) *Attorney, Agent, or Firm* — Slater Matsil, LLP

(57) ABSTRACT

A method of determining a bonding energy of a bonded wafer includes receiving the bonded wafer including a first wafer bonded with a second wafer, and inserting a blade between the first wafer and the second wafer to form a crack between the first wafer and the second wafer, the crack extending from a portion of the blade contacting the first wafer and the second wafer to a point where the first wafer and the second wafer are still bonded. The method further includes passing light beams through the crack at an outer edge of the bonded wafer, and collecting light beams transmitting through the crack at a light detector. And the method further includes determining the bonding energy of the bonded wafer based on a light intensity of the collected light beams.

20 Claims, 8 Drawing Sheets

(56)　　　　　References Cited

U.S. PATENT DOCUMENTS

| 11,670,524 | B2 | | 6/2023 | Yu et al. | |
|---|---|---|---|---|---|
| 12,307,731 | B2 | * | 5/2025 | Deliwala | G01B 9/02091 |
| 2016/0003722 | A1 | | 1/2016 | Kombokias | |
| 2019/0369506 | A1 | * | 12/2019 | Sakata | H01L 21/68742 |
| 2020/0217805 | A1 | | 7/2020 | Sugiura et al. | |
| 2021/0299879 | A1 | * | 9/2021 | Pinter | B25J 9/1697 |
| 2023/0115922 | A1 | | 4/2023 | Lee et al. | |
| 2023/0282494 | A1 | | 9/2023 | Yu et al. | |
| 2024/0192102 | A1 | | 6/2024 | Park et al. | |

FOREIGN PATENT DOCUMENTS

| CN | 109540786 | A | | 3/2019 | | |
|---|---|---|---|---|---|---|
| CN | 112701058 | A | | 4/2021 | | |
| CN | 109524321 | B | | 12/2021 | | |
| CN | 114648489 | A | | 6/2022 | | |
| JP | 2012021881 | A | * | 2/2012 | | G01N 21/89 |
| KR | 20120007465 | A | * | 1/2012 | | G01N 21/89 |
| KR | 20220033432 | A | * | 3/2022 | | H01L 21/324 |
| KR | 20230127322 | A | * | 8/2023 | | G01N 21/8806 |
| WO | 2004072585 | A2 | | 8/2004 | | |
| WO | WO-2009125896 | A1 | * | 10/2009 | | G01N 21/9501 |
| WO | 2023115965 | A1 | | 6/2023 | | |
| WO | WO-2023189675 | A1 | * | 10/2023 | | G01R 31/2874 |

OTHER PUBLICATIONS

Colonel, L. et al., "Double cantilever beam bonding energy measurement using confocal IR microscopy," Journal of Applied Physics, vol. 132, Issue 21, Dec. 2, 2022, 12 pages.

Fan, J. et al., "A novel method to detect wafer-bonding energy using function fitting," Rev. Sci. Instrum., vol. 92, Dec. 30, 2021, 8 pages.

Masteika, V. et al., "The effect of atmospheric moisture on crack propagation of the interface between directly bonded silicon wafers," Microsystem Technologies, vol. 19, No. 5, Nov. 3, 2012, 13 pages.

Navarro, E., "Direct Wafer Bonding Dynamics," HAL open science, Mechanics [physics.med-ph], Universite de Grenoble, HAL Id: tel-01048574, last revised Mar. 24, 2016 (v2), 116 pages.

Wikipedia, "Direct bonding," downloaded Apr. 22, 2024, https://en.wikipedia.org/wiki/Direct_bonding, 6 pages.

Wikipedia, "Wafer bond characterization," downloaded Apr. 22, 2024, https://en.wikipedia.org/wiki/Wafer_bond_characterization, 7 pages.

Baek, K., et al., "Chip level evaluation of wafer-to-wafer direct bonding strength with bending test," 2023 IEEE 73rd Electronic Components and Technology Conference (ECTC), Orlando, FL, USA, doi: 10.1109/ECTC51909.2023.00059, May 30, 2023-Jun. 2, 2023, pp. 310-317.

EV Group (EVG), "EVG@20 IR Inspection System," https://www.evgroup.com/products/metrology/evg20, downloaded Dec. 5, 2024, 6 pages.

Fournel, F. et al., "Water Stress Corrosion in Bonded Structures," 2015 ECS J. Solid State Sci. Technol., vol. 4, Feb. 18, 2015, 8 pages.

Pantzas, K., et al., "Measuring the surface bonding energy: A comparison between the classical double-cantilever beam experiment and its nanoscale analog," AIP Advances, vol. 10, 045006, https://doi.org/10.1063/1.5143843, Apr. 2, 2020, 9 pages.

Masteika, V., et al., "Automatic Maszara Testing Jig," 2017 5th International Workshop on Low Temperature Bonding for 3D Integration (LTB-3D), Tokyo, Japan, , doi: 10.23919/LTB-3D.2017.7947458, May 16-18, 2017, pp. 62-62.

* cited by examiner

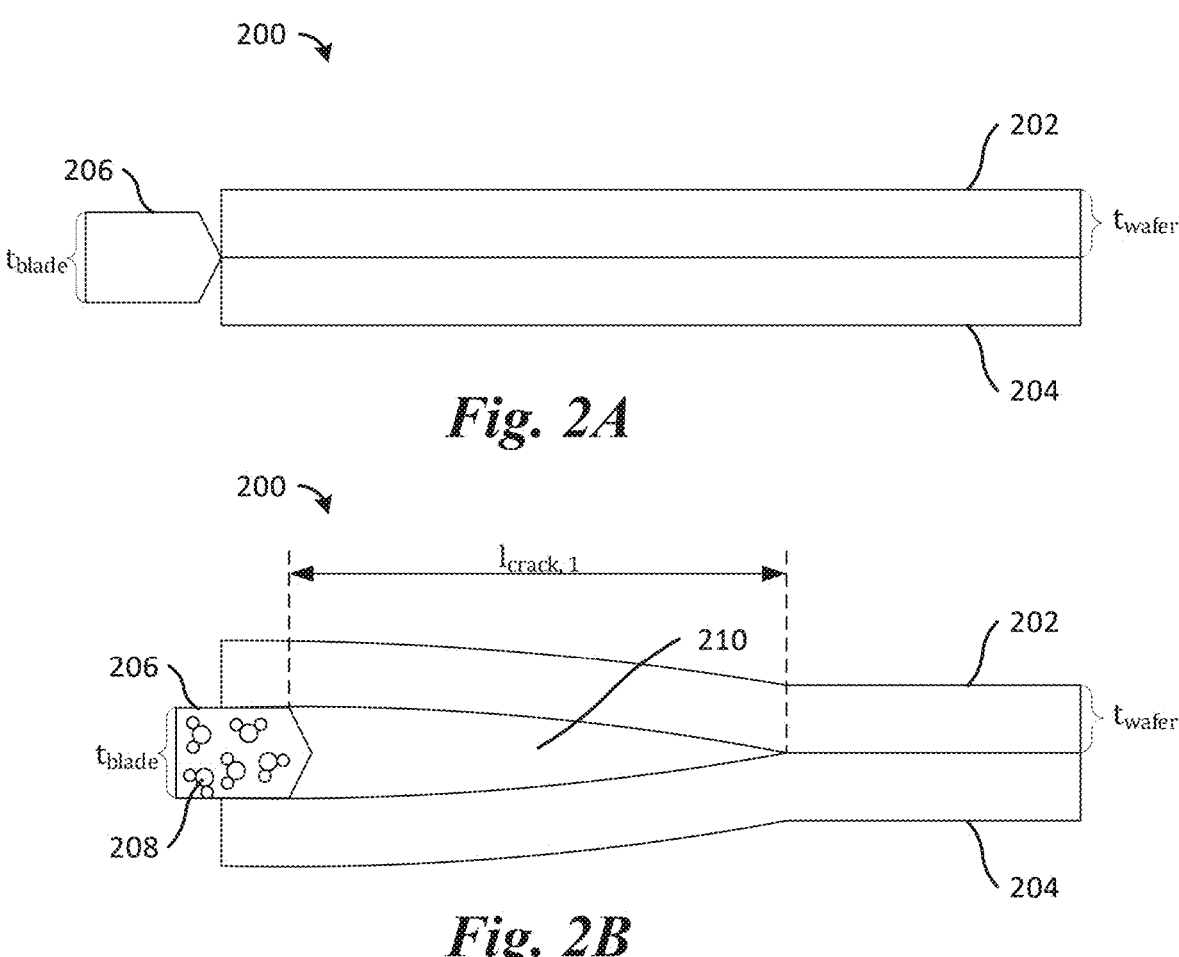
*Fig. 2A*
*Fig. 2B*
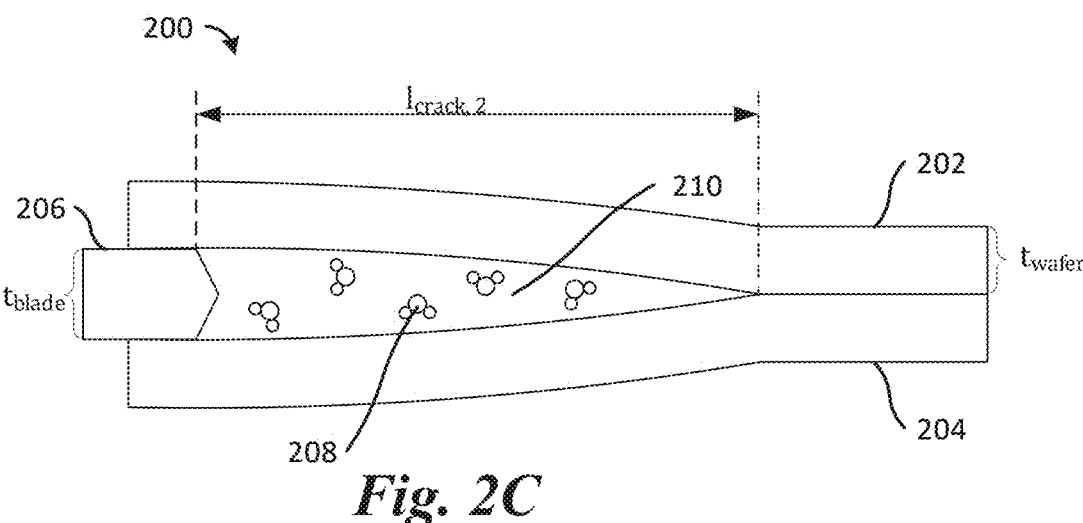
*Fig. 2C*

700

710 — Insert a blade between a first wafer and a second wafer of a bonded wafer to form a crack.

720 — Pass light beams through the crack at an outer edge of the bonded wafer.

730 — Collect light beams transmitting through the crack at a light detector.

740 — Determine the bonding energy of the bonded wafer based on a light intensity of the collected light beams.

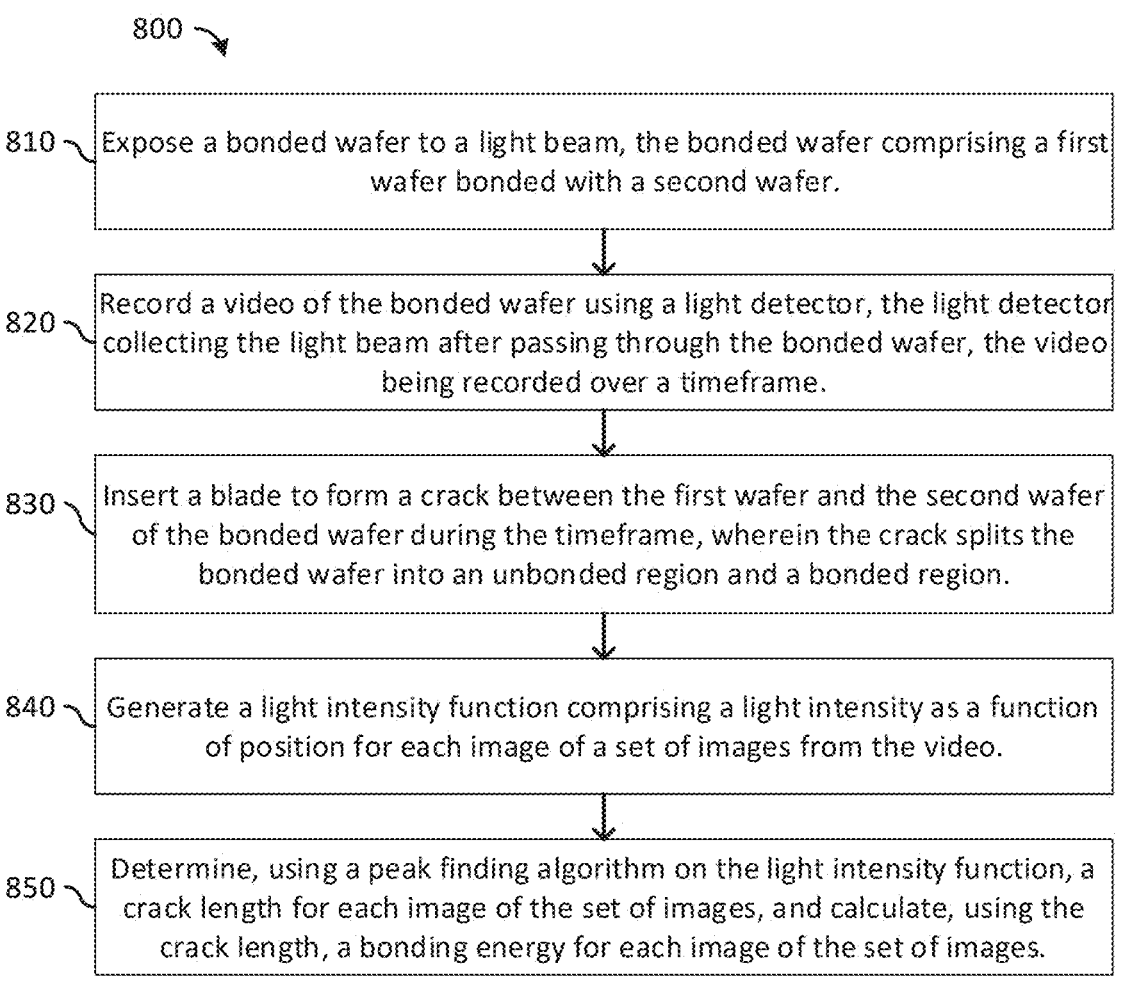

800

810 — Expose a bonded wafer to a light beam, the bonded wafer comprising a first wafer bonded with a second wafer.

820 — Record a video of the bonded wafer using a light detector, the light detector collecting the light beam after passing through the bonded wafer, the video being recorded over a timeframe.

830 — Insert a blade to form a crack between the first wafer and the second wafer of the bonded wafer during the timeframe, wherein the crack splits the bonded wafer into an unbonded region and a bonded region.

840 — Generate a light intensity function comprising a light intensity as a function of position for each image of a set of images from the video.

850 — Determine, using a peak finding algorithm on the light intensity function, a crack length for each image of the set of images, and calculate, using the crack length, a bonding energy for each image of the set of images.

*Fig. 8*

BONDING ENERGY MEASUREMENT

TECHNICAL FIELD

The present invention relates generally to semiconductor manufacturing, and, in particular embodiments, to systems and methods for measuring the bonding energy of a bonded wafer.

BACKGROUND

Bonding energy, also referred to as adhesion energy or surface energy, reflects the strength of the interaction between two surfaces that are in contact. It plays a significant role in various industries, such as semiconductor manufacturing, coating technologies, material synthesis, and others where the integrity of material bonds is crucial.

Existing methods for determining bonding energy include various forms of spectroscopy, tensiometry, and microcantilever-based approaches. These methods often utilize controlled conditions, such as vacuum or inert atmospheres, to provide accurate measurements. Controlled conditions present several limitations: they can be cost-prohibitive; they do not simulate real-world conditions where materials often operate; and in some cases, they prevent in situ monitoring of bonding processes.

In most cases, there is a gap between the practical application conditions and the capabilities provided by these conventional techniques. Therefore, an improved method and system for measuring the bonding energy of materials that allows for accurate measurements in ambient environmental conditions without the drawbacks associated with current methods may be beneficial.

SUMMARY

A method of determining a bonding energy of a bonded wafer includes receiving the bonded wafer including a first wafer bonded with a second wafer, and inserting a blade between the first wafer and the second wafer to form a crack between the first wafer and the second wafer, the crack extending from a portion of the blade contacting the first wafer and the second wafer to a point where the first wafer and the second wafer are still bonded. The method further includes passing light beams through the crack at an outer edge of the bonded wafer, and collecting light beams transmitting through the crack at a light detector. And the method further includes determining the bonding energy of the bonded wafer based on a light intensity of the collected light beams.

A method of determining a bonding energy of a bonded wafer includes exposing the bonded wafer to a light beam, the bonded wafer including a first wafer bonded with a second wafer, and recording a video of the bonded wafer using a light detector, the light detector collecting the light beam after passing through the bonded wafer, the video being recorded over a timeframe. The method further includes inserting a blade to form a crack between the first wafer and the second wafer of the bonded wafer during the timeframe, where the crack splits the bonded wafer into an unbonded region and a bonded region, and generating a light intensity function including a light intensity as a function of position for each image of a set of images from the video. And the method further includes determining, using a peak finding algorithm on the light intensity function, a crack length for each image of the set of images, and calculating, using the crack length, a bonding energy for each image of the set of images.

A system for determining a bonding energy of a bonded wafer includes a light source optically coupled to a light diffuser configured to support a bonded wafer, the bonded wafer including a first wafer bonded with a second wafer, a blade inserter to insert a blade in the bonded wafer, and a light detector. And the system further includes a controller operationally coupled to the light source, the blade inserter, the light detector, and coupled to a memory storing a program to be executed in the controller, the program including instructions to insert the blade between the first wafer and the second wafer to form a crack between the first wafer and the second wafer, the crack extending from a portion of the blade contacting the first wafer and the second wafer to a point where the first wafer and the second wafer are still bonded, pass light beams through the crack at an outer edge of the bonded wafer, collect light beams transmitting through the crack at the light detector, and determine the bonding energy of the bonded wafer based on a light intensity of the collected light beams.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A-2C are cross-sectional view schematic diagrams of a bonded wafer during various points in time throughout the bonding energy measurement method of this disclosure according to an embodiment;

FIG. 8 is a flowchart of a bonding energy measurement method of this disclosure according to an embodiment.

DETAILED DESCRIPTION OF ILLUSTRATIVE EMBODIMENTS

Figure 1:
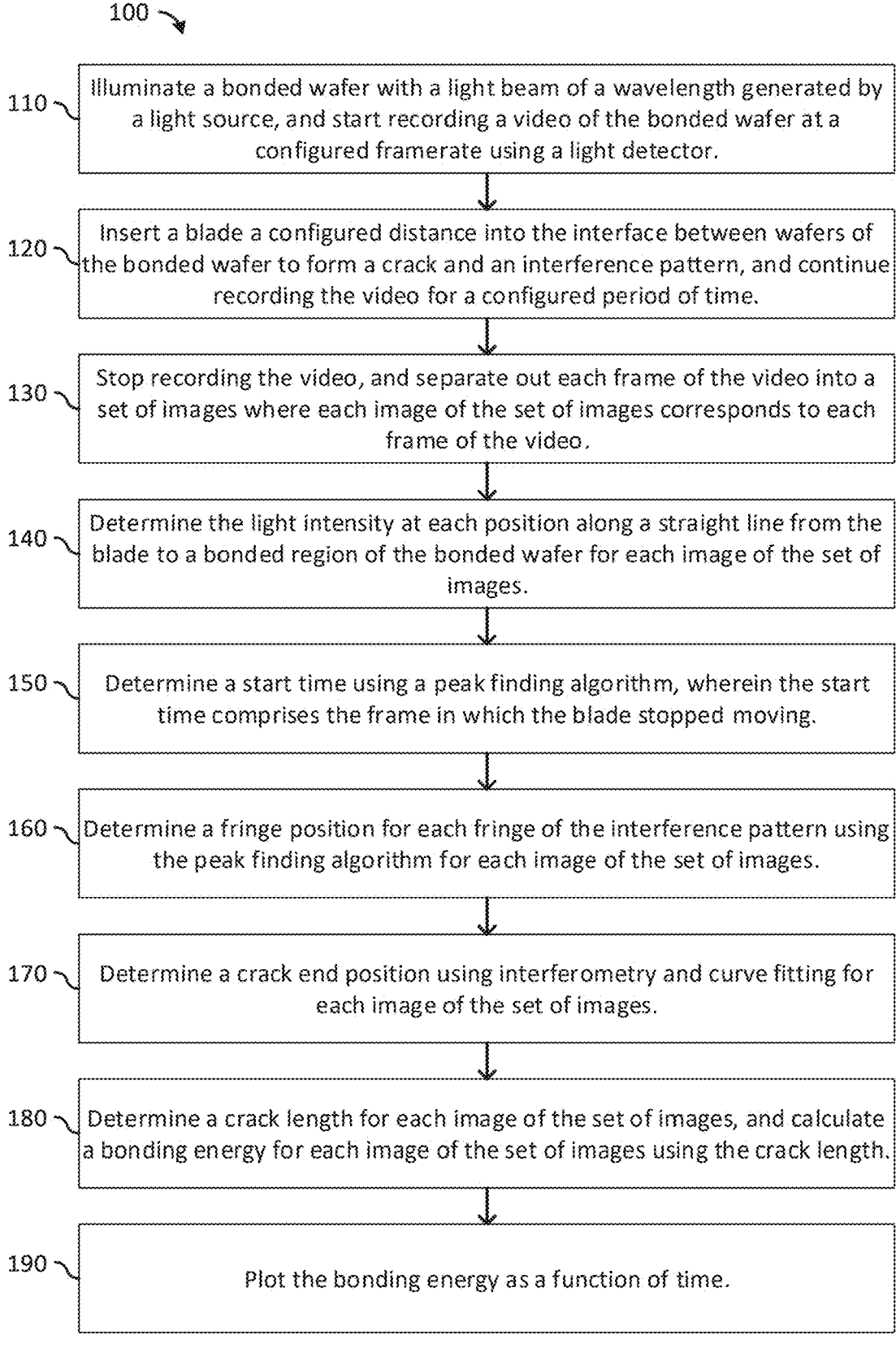
FIG. 1 is a flowchart of a bonding energy measurement method of this disclosure according to an embodiment.

Conventional bonding energy measurement methods use Double Cantilever Beam (DCB) tests to form a crack in a bonded wafer where a light beam passing through the bonded wafer forms an interference pattern. The crack being formed has a crack length, which is conventionally measured by eye every minute using the interference pattern, and the crack length may be used to determine the bonding energy (by using the Maszara equation, for example). After several minutes, the measured bonding energy value is used as the bonding energy of the bonded wafer. A difficulty encountered when measuring the bonding energy using the conventional method was the influence of ambient humidity on crack length measurements. Water molecules in the environment may move into the crack region and weaken bonds at the point where the crack ends, which is known as stress corrosion. Stress corrosion causes crack lengths to increase over time, which directly impacts the measured crack length and causes bonding energy measurement methods to be highly inaccurate.

To increase the accuracy of bonding energy measurements, bonding energy measurement methods incorporated glove boxes with controlled atmospheres and temperatures to reduce the influence of ambient humidity on bonding energy measurements. The introduction of glove boxes increased the accuracy of bonding energy measurements by eliminating environmental errors, but introduced their own difficulties, too.

Current methods for conducting Double Cantilever Beam (DCB) tests within a glove box environment present several technical challenges that may adversely affect the reliability and reproducibility of test results. The Double Cantilever Beam test is extensively used for characterizing the fracture toughness and delamination properties of materials, yet when performed inside the constrained space of a glove box, various difficulties are encountered.

Firstly, the reduced workspace of a glove box significantly constrains the manipulation of the testing apparatus and specimens. This limited maneuverability makes it difficult to accurately position the specimen, particularly for larger or unwieldly samples. Moreover, alignment of the test sample within the testing machine often requires precise adjustments that can be cumbersome to achieve when restricted by glove ports.

While glove boxes are designed for controlled environments, variations in temperature and humidity within the box may arise during long-term tests. These variations can impact material properties and potentially skew fracture toughness measurements. Furthermore, maintaining an inert atmosphere can be challenging due to leaks or degradation of the seal over time, potentially exposing sensitive materials to outside contaminants.

Operators conduct DCB tests through glove ports which are not always ergonomically designed, leading to discomfort or fatigue during extended testing periods. This can result in less precise control over the testing process and increased potential for experimental error. In addition, access to controls and measurement instruments may be awkwardly positioned for someone working through glove ports.

The adaptation of DCB test equipment to fit within a glove box often requires customization which can introduce variables not present in standard testing setups. Calibrating instruments and controlling test parameters while working through glove ports can be more challenging, potentially affecting the quality and accuracy of data collected.

Observation windows on glove boxes provide limited viewing angles and may become obscured during extensive use, hindering proper visual monitoring of the DCB test. This restricted view can prevent timely detection of any misalignment or failure, reducing the reliability of test outcomes.

Glove boxes greatly increase the cost complexity of bonding energy measurement systems and drastically reduce the throughput due to purging times in between each test.

To address the enumerated issues associated with DCB tests in a glove box, this disclosure presents embodiment bonding energy measurement methods and systems that use a light detector to record video of the bonded wafer throughout testing. Due to the water in the environment taking a relatively large timeframe to diffuse to the crack in comparison to the framerate of the video, the bonding energy measurement systems and methods of this disclosure can measure an anhydrous bonding energy without using a glovebox (because the ambient humidity has not had enough time to cause stress corrosion) and can make consistent bonding energy measurements even as the humidity changes. Further, by not using a glove box, the costs for the bonding energy measurement systems and methods of this disclosure are reduced in comparison with conventional systems and methods, and throughput is increased.

In the bonding energy measurement method of this disclosure, the crack length is determined from peak finding algorithms rather than by eye, and interferometry is used to measure the actual end of the induced crack, both of which increase the accuracy of the crack length and bonding energy measurements. Further, by using the light detector to record a video of the test, the bonding energy measurement method may monitor the bonding energy measurement over time to document the change in the bonding energy over time as a result of ambient humidity as well as determine if there is residual moisture between the wafers of the bonded wafer.

Figure 3:
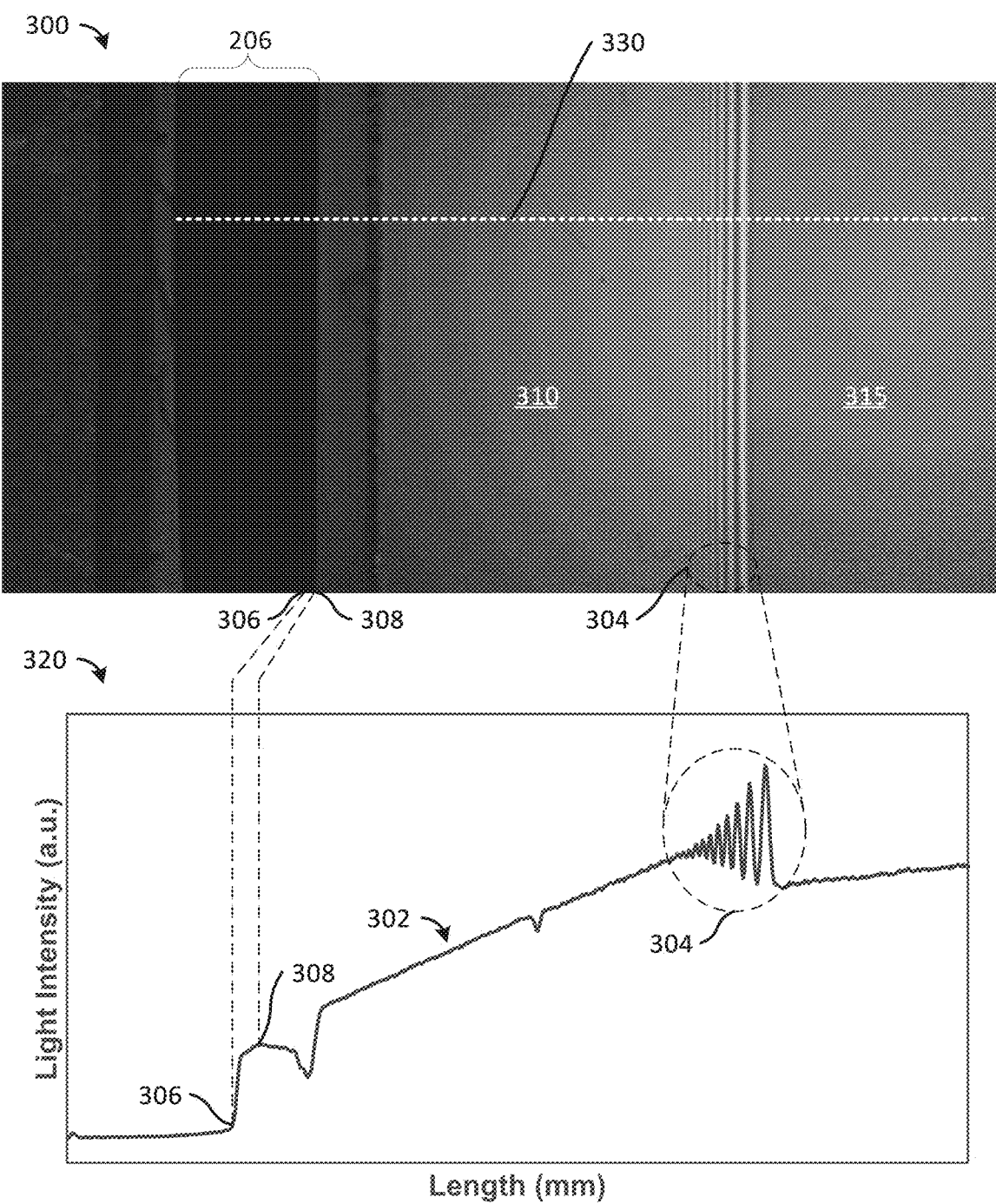
FIG. 3 is a top view image of a bonded wafer with a blade inserted to form a crack alongside a plot of a light intensity as a function of distance from the edge of the bonded wafer according to an embodiment.
Figure 4:
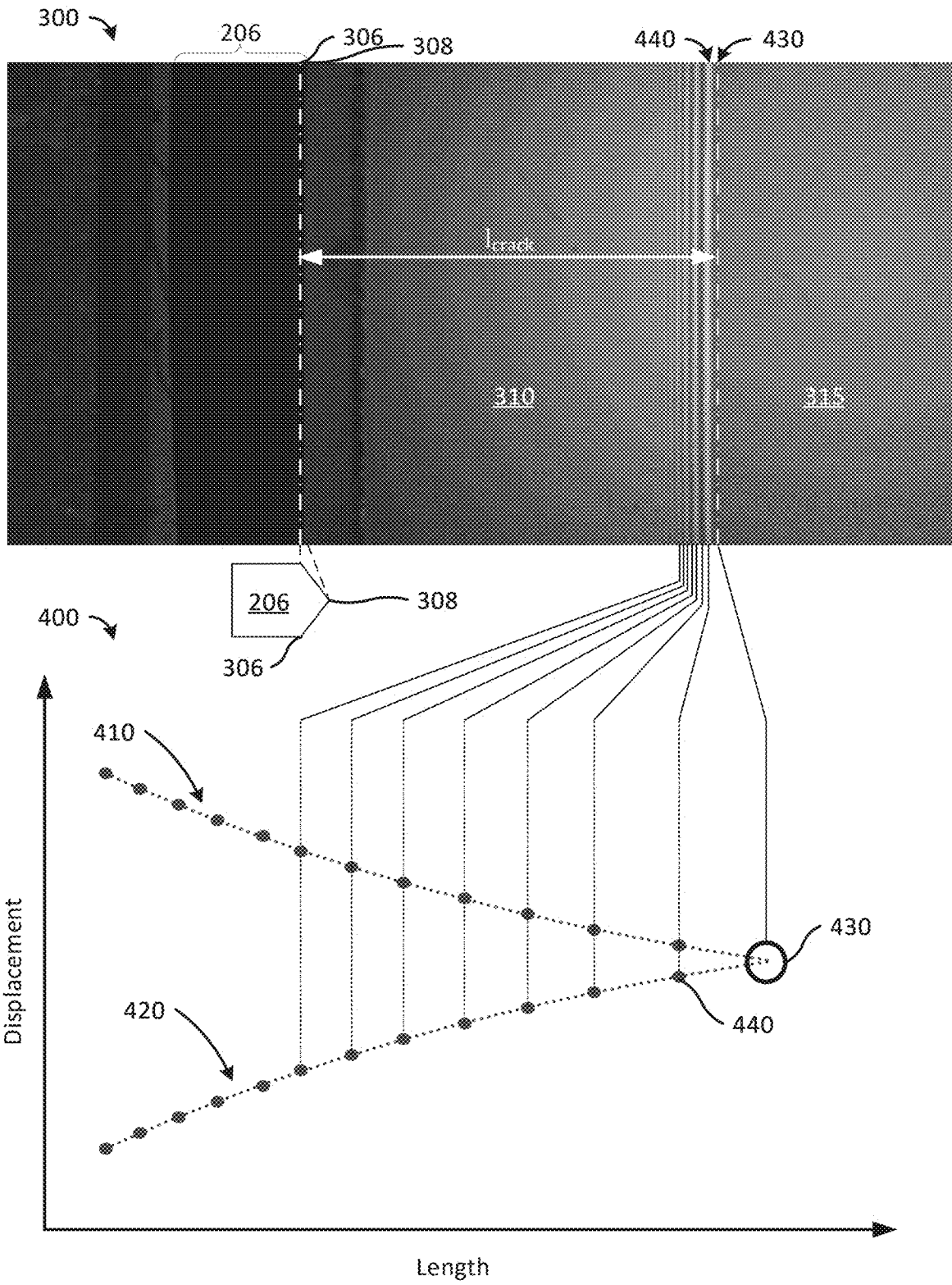
FIG. 4 is a top view image of a bonded wafer with a blade inserted to form a crack alongside a plot of a displacement from being bonded of wafers of the bonded wafer as a function of distance from the edge of the bonded wafer according to an embodiment.
Figure 5:
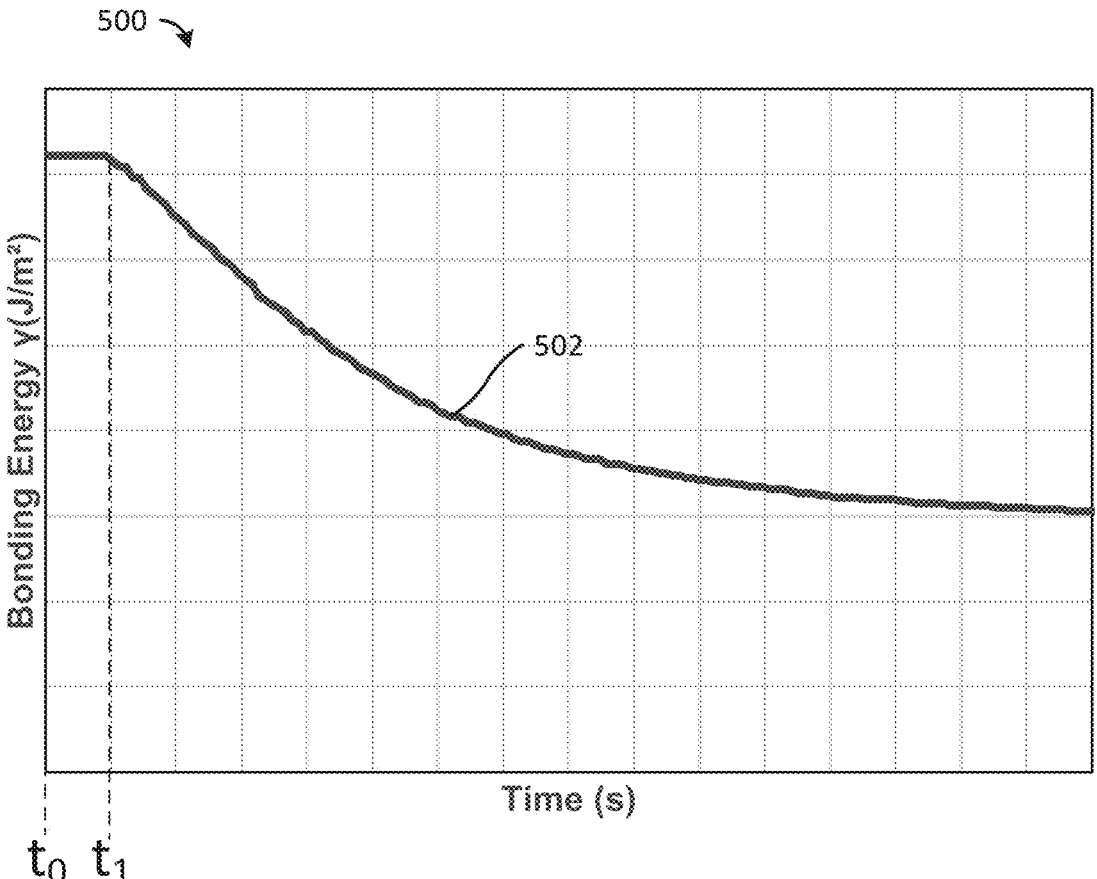
FIG. 5 is a plot illustrating the bonding energy as a function of time for a bonded wafer according to an embodiment.
Figure 6:
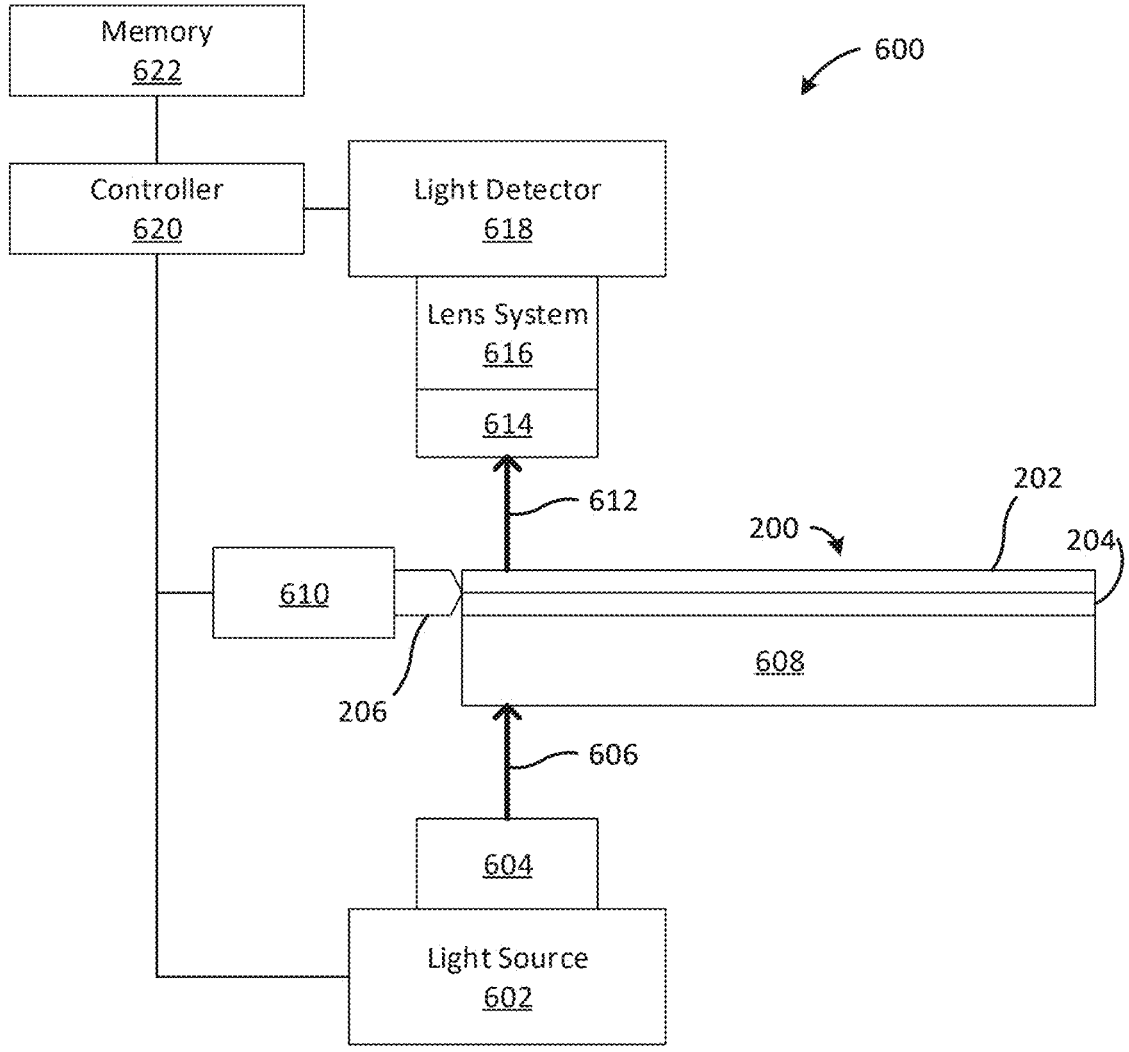
FIG. 6 is a system diagram of a bonding energy measurement system capable of implementing the bonding energy measurement method of this disclosure according to an embodiment.

Embodiments provided below describe various methods for measuring the bonding energy of a bonded wafer, and in particular, methods and systems using a light detector to continuously record a light intensity throughout a test procedure which may be used to measure a crack length to be converted into the bonding energy measurement of the bonded wafer. The following description describes the embodiments. An example bonding energy measurement method of this disclosure is illustrated in the flowchart of FIG. 1. Three different points in time of the bonding energy measurement method of this disclosure are illustrated in the cross-sectional view schematic diagrams of a bonded wafer in FIGS. 2A-2C. A recorded light intensity as a function of distance from the edge of the bonded wafer is illustrated in the plot of FIG. 3 alongside a top view image of the bonded wafer after forming a crack for the bonding energy measurement method of this disclosure. A plot of displacement from bonded the wafers of the bonded wafer are as a function of distance from the edge of the bonded wafer according to the locations of the light and dark fringes of the interference pattern is illustrated in FIG. 4 alongside a top view image of the bonded wafer after forming a crack for the bonding energy measurement method of this disclosure. A plot of the bonding energy as a function of time is illustrated in FIG. 5. A bonding energy measurement system capable of implementing the bonding energy measurement method of this disclosure is illustrated in FIG. 6. And other embodiment methods for measuring the bonding energy of a bonded wafer are described using flowcharts illustrated in FIGS. 7-8.

The bonding energy measurement method of this disclosure uses a light source to illuminate a bonded wafer and records video (or a set of images) of the illuminated bonded wafer using a light detector throughout a test process. The test process comprises inserting a blade into the interface between wafers of the bonded wafer to form a crack, and the light beam passing through the bonded wafer forms an interference pattern. After recording the video, the bonding energy measurement method separates all of the recorded images and determines a light intensity at each position along a straight line from the blade, through a debonded region (the crack), and into the bonded region of the bonded wafer for each of the recorded images. The bonding energy measurement method of this disclosure may then use the interference pattern, the light intensity measurement, and a peak finding algorithm to determine a crack length. And, in an embodiment, the crack length may be used along with the Maszara equation to calculate the bonding energy.

The Maszara equation relates constants which are properties of the dimensions and materials of the bonded wafer with the measured crack length to calculate the bonding energy of the bonded wafer. In an embodiment where the bonded wafer comprises a first wafer and a second wafer of different materials and may vary in their corresponding wafer thicknesses, the bonding energy ($E_b$) may be calculated using the Maszara equation, $$E_b = \frac{3(t_{blade})^2 E_1 (t_{wafer,1})^3 E_2 (t_{wafer,2})^3}{16 (l_{crack})^4 \left[ E_1 (t_{wafer,1})^3 + E_2 (t_{wafer,2})^3 \right]},$$

which relates the Effective Young's modulus of the first wafer ($E_1$), the thickness of the first wafer ($t_{wafer,1}$), the Effective Young's modulus of the second wafer ($E_2$), the thickness of the second wafer ($t_{wafer,2}$), the thickness of the blade ($t_{blade}$), and the length of the crack in the bonded wafer ($l_{crack}$). The Effective Young's modulus for each wafer and the thicknesses of the blade and the wafers are all properties of the materials of the bonded wafer and the dimensions of the wafers and blade. Further, the Effective Young's modulus of certain materials also depends on the crystal orientation of the wafers in the direction the crack (or measurement) is made, which may also be accounted for using the properties of the materials and orientation of the bonded wafer in the bonding measurement system.

In an embodiment where the wafers of the bonded wafer are the same material and the same thickness, the bonding energy ($E_b$) may be calculated using a simplified form of the Maszara equation, $$E_b = \frac{3 E^* (t_{blade})^2 (t_{wafer})^3}{32 (l_{crack})^4},$$

which relates the Effective Young's modulus of the bonded wafer ($E^*$), the thickness of the blade ($t_{blade}$), one half the thickness of the bonded wafer ($t_{wafer}$), and the length of the crack in the bonded wafer ($l_{crack}$). The Effective Young's modulus, the thickness of the blade, and one half the thickness of the bonded wafer are all constants that are properties of the materials of the bonded wafer and the dimensions of the bonded wafer and blade. An embodiment method for determining the bonding energy of a bonded wafer is described using the flowchart of FIG. 1.

FIG. 1 is a flowchart of a bonding energy measurement method 100 of this disclosure according to an embodiment. In box 110, the bonding energy measurement method 100 illuminates a bonded wafer with a light beam of a wavelength generated by a light source, and starts recording a video of the bonded wafer at a configured framerate using a light detector. In various embodiments, the framerate of the video is larger than about 1 frames/second. In an embodiment, the video recorded may be a high-resolution video with a high framerate, such as larger than about 5 frames/second.

After starting the recording of the video, the bonding energy measurement method 100 proceeds to box 120. In box 120, the bonding energy measurement method 100 begins inserting a blade a configured distance into the interface between wafers of the bonded wafer to form a crack and the light beam forms an interference pattern. The crack splits the bonded wafer into an unbonded region (where the wafers of the bonded wafer are split apart to form the crack) and a bonded region (where the wafers of the bonded wafer are still bonded). While the blade is inserted and after the blade has been inserted the configured distance, the bonding energy measurement method 100 continues recording the video until the video has recorded for a configured period of time. In various embodiments, the configured period of time is greater than about 180 seconds.

Once the video has recorded for the configured period of time, the bonding energy measurement method 100 proceeds to box 130. In box 130, the bonding energy measurement method 100 stops the recording of the video, and separates out each frame of the video into a set of images where each image of the set of images corresponds to each frame of the video. For example, in an embodiment where the configured framerate is about 2 frames/second and the configured period of time is about 100 seconds, the number of images of the set of images would be 200 images.

After separating the video into the set of images, the bonding energy measurement method 100 proceeds to box 140. In box 140, the bonding energy measurement method 100 determines the light intensity at each position along a straight line from the blade, through the unbonded region, and into the bonded region of the bonded wafer for each image of the set of images. The light intensity may be the measured light intensity of each pixel of the image the straight line passes through, and the position may be the distance the corresponding pixels are located from the edge of the bonded wafer. Thus, each pixel along the straight line provides a light intensity and position from the edge of the bonded wafer, which may be used as the light intensity at each position along the straight line. In an embodiment, rather than plotting the light intensity as a function of position from the edge of the bonded wafer, the light intensity and position may be stored in a function, or array.

After determining the light intensity as a function of position from the edge of the bonded wafer, the bonding energy measurement method 100 proceeds to box 150. In box 150, the bonding energy measurement method 100 determines a start time for measuring the bonding energy, wherein the start time comprises the frame in which the blade stopped moving (the frame in which the blade reached the configured distance). In an embodiment, determining the start time comprises using a peak finding algorithm to find the earliest image of the set of images where the blade's position matches the position of the blade in the last image of the set of images. The peak finding algorithm identifies local maxima and minima in a dataset, such as the light intensity plot (or light intensity function) described above.

With the start time determined, the bonding energy measurement method 100 continues in box 160. In box 160, the bonding energy measurement method 100 determines a fringe position for each fringe of the interference pattern using the peak finding algorithm for each image of the set of images. The peak finding algorithm may run on the light intensity plot (or light intensity function) for each image of the set of images, and determine the locations of the light fringes and the dark fringes of the interference pattern.

Once the fringe position for each fringe of the interference pattern on each image of the set of images is determined, the bonding energy measurement method 100 proceeds to box 170. In box 170, the bonding energy measurement method 100 determines a crack end position using interferometry and curve fitting for each image of the set of images. In various embodiments, the interferometry may be used to determine the separation distance between the wafers of the bonded wafer by inputting the position of the fringe and the wavelength of the light beam. Using the separation distance (or displacement) of the bonded wafers from their bonded location, a curve fit may be used for each of the wafers to project to a point where each curve meets (a point where the wafers of the bonded wafer are still bonded). The point at which the curves meet may then be used as the crack end position. This process is described further using the detailed description of FIG. 4 below.

With the crack end position determined for each image of the set of images, the bonding energy measurement method 100 proceeds to box 180. In box 180, the bonding energy measurement method 100 determines a crack length for each image of the set of images, and calculates a bonding energy for each image of the set of images using the crack length and the Maszara equation. Though the embodiment method described in the flowchart of FIG. 1 uses the Maszara equation, other equations may be used to determine the bonding energy in other embodiments. The crack length may be determined by measuring the distance from the point on the blade contacting the wafers of the bonded wafer to the crack end position. For example, in embodiments using blades with a bevel, the point of contact is the point on the blade that transitions from being flat to the start of the bevel of the blade.

And after determining the bonding energy for each image of the set of images, the bonding energy measurement method 100 continues in box 190. In box 190, the bonding energy measurement method 100 plots the bonding energy as a function of time for the bonded wafer. Each image of the set of images corresponds to a frame of the video, and starting from the image of the set of images that corresponds to the start time, each image has a calculated crack length and subsequent bonding energy which may be plotted over time. In various embodiments, in order to determine the time of each image, the framerate is used along with the number of images (or frames) past the start time the corresponding image is located.

The plot of the bonding energy as a function of time may then be used to determine various parameters of the bonded wafer. For example, an advantage of the bonding energy measurement method 100 is the ability to measure the bonding energy of the bonded wafer before ambient humidity in the environment has entered the crack and diminished the bond strength of the bonded wafer. The anhydrous bonding energy for the bonded wafer may be determined by using the bonding energy of the bonding energy plot during a first timeframe before ambient humidity has diffused into the crack to cause stress corrosion and weakening of the bond strength of the bonded wafer (causing the crack length to increase).

The bonding energy measurement method of this disclosure also has the benefit of being capable of quickly identifying water induced microvoids. For example, if the plot of the bonding energy as a function of time falls off without remaining stable for a predefined timeframe, there is likely excess moisture trapped in the bonding interface causing stress corrosion before ambient humidity diffuses to the crack. In other embodiments, rather than plotting the bonding energies over time, a bonding energy array comprising the same information as the bonding energy plot may be stored and used similarly as described above for the bonding energy plot.

FIGS. 2A-2C illustrate cross-sectional view schematic diagrams of a bonded wafer 200 at three different points in time of the bonding energy measurement method of this disclosure. For example, FIGS. 2A-2C may be three different points in time of the bonding energy measurement method 100 of FIG. 1. The three different points in time are: prior to inserting the blade; after inserting the blade to form a crack and before ambient humidity has caused stress corrosion; and after ambient humidity has caused stress corrosion to weaken bonds and influence the bonding energy measurement.

FIG. 2A illustrates the bonded wafer 200 prior to inserting a blade 206 to form a crack for measuring the bonding energy of the bonded wafer 200. The bonded wafer 200 comprises a first wafer 202 bonded to a second wafer 204. In the embodiment illustrated in FIGS. 2A-2C, the first wafer 202 and the second wafer 204 both have a wafer thickness ($t_{wafer}$), which is the same for both the first wafer 202 and the second wafer 204. As a result, half the thickness of the bonded wafer 200 is the same as the thickness of one of the wafers of the bonded wafer 200, or $t_{wafer}$. Further, the blade 206 has a blade thickness ($t_{blade}$).

The bonded wafer 200 may comprise any two or more semiconductor elements (such as integrated device dies, wafers, or etcetera) bonded to one another to form a bonded wafer 200. For example, in various embodiments, the first wafer 202 and the second wafer 204 may both be silicon wafers which have been patterned and bonded to form the bonded wafer 200. The bonded wafer 200 may be any wafers bonded through conventional wafer bonding methods, such as direct bonding, surface activated bonding, plasma activated bonding, anodic bonding, adhesive bonding, thermocompression bonding, reactive bonding, or etcetera. For example, the bonded wafer 200 may comprise the first wafer 202 and the second wafer 204 bonded together with an adhesive in various embodiments. In other embodiments, the first wafer 202 and the second wafer 204 may be directly bonded to one another without an adhesive. Similarly, the first wafer 202 and the second wafer 204 may be any of the many types of semiconductor wafer (silicon, silicon-on-insulator, germanium, gallium arsenide, or etcetera).

In various embodiments, the blade 206 may be any wedge-like object capable of forming a crack in the bonded wafer 200 at the interface between the first wafer 202 and the second wafer 204. For example, in various embodiments, a razor blade with a bevel may be used to form the crack in the bonded wafer 200. The material of the blade 206 may be any material suitable for forming the crack in the bonded wafer 200 and opaque to the spectrum of the light beam used in the bonding energy measurement method of this disclosure. In an embodiment, the blade 206 may be a platinum coated razor blade with a bevel.

FIG. 2B illustrates the bonded wafer 200 after inserting the blade 206, but before ambient humidity (or water molecules 208) have been able to enter an air gap 210. The bonded wafer 200 illustrated in FIG. 2B may represent the bonding energy measurement method 100 after box 120 in FIG. 1. As illustrated in FIG. 2B, the blade 206 formed a crack in the bonded wafer 200, but the water molecules 208 have not entered the air gap 210. The crack has a crack length labeled as a first crack length, $l_{crack,\,1}$, where the crack length is illustrated as the distance from the point of the blade 206 contacting the first wafer 202 and the second wafer 204 to the end point of the crack (or the crack end position).

The point in time illustrated in FIG. 2B is the timeframe between the start time of the bonding energy measurement method and before the water molecules 208 have diffused into the air gap 210. Thus, the timeframe illustrated in FIG. 2B provides the anhydrous bonding energy measurement because the water molecules 208 have not yet diffused into the air gap 210 to cause stress corrosion and start decreasing the bonding energy of the bonds between the first wafer 202 and the second wafer 204. In other words, the bonding energy measurement made during the timeframe illustrated in FIG. 2B would yield the anhydrous bonding energy of the bonded wafer 200 without influence from ambient humidity. After enough time has passed, the water molecules 208 will enter the air gap 210 and cause stress corrosion of the bonds between the first wafer 202 and the second wafer 204, such as is illustrated in FIG. 2C.

FIG. 2C illustrates the bonded wafer 200 after inserting the blade 206, and after enough time has passed for the ambient humidity to allow for the water molecules 208 to diffuse into the air gap 210. Similar to FIG. 2B, the bonded wafer 200 illustrated in FIG. 2C may represent the bonding energy measurement method 100 after box 120 in FIG. 1. The difference between FIG. 2C and FIG. 2B is that the water molecules 208 have had enough time to enter the air gap 210 and cause stress corrosion of the bonds between the first wafer 202 and the second wafer 204. As a result, the crack has increased in length such that a second crack length, $l_{crack,\,2}$, is larger than the first crack length, $l_{crack,\,1}$. As time continues to progress, the second crack length, $l_{crack,\,2}$, will continue to increase as the water molecules 208 cause more stress corrosion in the bonded wafer 200.

As described above, the bonding energy measurement method of this disclosure uses a light intensity as a function of distance from the outer edge of the bonded wafer 200 plot (or array) to determine the start time of the bonding energy as a function of time plot (or array), and to determine the fringe positions to be used to find the crack end position. Further, the light intensity plot (or function) may also be used along with a peak finding algorithm to determine the positions of light and dark fringes of the interference pattern formed near the end point of the crack. An example image from the set of images and the associated light intensity plot (or function) for that image is illustrated in FIG. 3.

FIG. 3 is a top view image 300 of a bonded wafer with the blade 206 inserted to form a crack for measuring the bonding energy using the bonding energy measurement method of this disclosure alongside an intensity plot 320 of a light intensity as a function of distance from the edge of the bonded wafer according to an embodiment. In an embodiment, the intensity plot 320 may be used to determine the fringe positions of the light and dark fringes as described in box 160 of FIG. 1. In a similar embodiment, the intensity plot 320 may also be used to determine the start time of the bonding energy measurement method 100 as described in box 150 of FIG. 1.

The top view image 300 of the bonded wafer illustrates a point in time of the bonding energy measurement method after inserting the blade 206 to form the crack, such as the illustration of the bonded wafer 200 in FIG. 2B. The crack splits the wafers of the bonded wafer into an unbonded region 310, and a bonded region 315. As described in box 140 of the bonding energy measurement method 100 of FIG. 1, a dotted line 330 illustrated in the top view image 300 may be used to determine the light intensity as a function of position from the edge of the bonded wafer. The dotted line 330 passes from the blade 206, through the unbonded region 310, and ends in the bonded region 315. For example, the dotted line 330 may be used to form the intensity plot 320 illustrated beneath the top view image 300 by plotting a measured light intensity of pixels along the dotted line 330 as a function of their position.

As described above in the bonding energy measurement method 100 of FIG. 1, the intensity plot 320 may be used to determine the fringe positions of the light and dark fringes of an interference pattern 304 using a peak finding algorithm. The peak finding algorithm may also be used to determine a start time for the bonding energy measurement by determining which image of the set of images is the first image where the position of the blade 206 matches the position of the blade 206 in the last image of the set of images.

The peak finding algorithm may be used to determine the position of a blade tip 308 and the position of a bevel start 306 of the blade 206. The light intensity plot of the earliest image in the set of images where the position of the blade tip 308 and the position of the bevel start 306 matches with the same positions in the light intensity plot determined for the last image in the set of images is the earliest image where the blade 206 stopped moving. And in an embodiment, the earliest image for which the blade 206 stopped moving may be used as the start time for the bonding energy measurement method. In an embodiment, the blade tip 308 may be determined using the peak finding algorithm, and by using a measurement of the length of the beveled portion of the blade 206 (or a bevel length measurement), the position of the bevel start 306 may be determined by subtracting the bevel length from the determined position of the blade tip 308.

The light intensity plot 320 illustrates a light intensity line 302 found by plotting the measured light intensity of the pixels along the dotted line 330 in the top view image 300. The position of the bevel start 306 of the blade 206 is illustrated, as well as the position of the blade tip 308 of the blade 206. The light intensity line 302 also illustrates the light intensities of the interference pattern 304, where the peak finding algorithm may be used to determine the positions of the light and dark fringes of the interference pattern 304. In various embodiments, once the positions of the light and dark fringes of the interference pattern 304 are determined, interferometry may be used to determine the displacement between the wafers of the bonded wafer and determine the crack end position, such as described using FIG. 4.

FIG. 4 is the top view image 300 of a bonded wafer with the blade 206 inserted to form a crack for measuring the bonding energy using the bonding energy measurement method of this disclosure alongside a displacement plot 400 of a displacement from being bonded of wafers of the bonded wafer as a function of distance from the edge of the bonded wafer according to an embodiment. In an embodiment, the displacement plot 400 may be used to determine a crack end position 430 as described in box 170 of FIG. 1. Similarly labeled elements may be as previously described.

In an embodiment, the displacement plot 400 may be used to determine an end point of the crack 430 using the fringe positions (which may be determined using the light intensity plot 320 in FIG. 3) and interferometry to calculate the displacement between the first wafer and the second wafer of the bonded wafer. The separation distance between a brightest fringe 440 and the next adjacent light fringe may be used to determine the displacement of the first wafer and the second wafer caused by the crack. From interferometry, it is known that the separation distance between adjacent fringes of the same type are the result of a change in separation distance between the first wafer and the second wafer being equal to the test wavelength of the light beam used in the bonding energy measurement method of this disclosure. Further, the displacement from the first wafer and the second wafer of the bonded wafer at the position of the brightest fringe 440 is equal to half of the test wavelength (the wavelength of the light beam produced by the light source for the bonding energy measurement method, such as infrared wavelengths between about 1000 nm and about 1100 nm). In various embodiments, the positions of the fringes of the interference pattern 204 are distances from the outer edge of the bonded wafer where the corresponding fringe occurs. In other embodiments, the positions of the fringes of the interference pattern 204 are radial distances from a center of the bonded wafer where the corresponding fringe occurs.

With the displacement between the first wafer and the second wafer of the bonded wafer caused by the crack determined, the bonding energy measurement method of this disclosure may form the displacement plot 400. In various embodiments, rather than forming the displacement plot 400 the bonding energy measurement method may form a displacement array storing the displacement between the wafers of the bonded wafer with their corresponding positions along a radial distance from the center of the bonded wafer. In the displacement plot 400, the upper data points are the positions of the light and dark fringes for the first wafer and the lower data points are the positions of the same light and dark fringes for the second wafer in an embodiment (where the data points disposed vertically above/below each other correspond to the same light or dark fringes). The vertical distance between the upper data points and the lower data points represent the displacement between the first wafer and the second wafer determined using interferometry.

After plotting the upper data points and the lower data points, the upper data points may be fit with a first curve 410 and the lower data points may be fit with a second curve 420. The first curve 410 and second curve 420 (corresponding to the first wafer and the second wafer, respectively) may be projected to a point where the two curves intersect (or where the displacement between the first wafer and the second wafer is zero). The point where the two curves intersect is the crack end position 430. In an embodiment, the displacement plot 400 may be used to determine the crack end position 430 such as described in box 170 of the bonding energy measurement method 100 of FIG. 1.

The crack end position 430 may then be used to determine the crack length of the crack formed in the bonded wafer. As illustrated by the double-sided arrow in the top view image 300, the crack length, $l_{crack}$, is the distance from the crack end position 430 to the point of the blade 206 contacting the first wafer and the second wafer, which is the bevel start 306 of the blade 206 in the illustrated embodiment. And the crack length, $l_{crack}$, may be used along with the Maszara equation to determine the bonding energy of the bonded wafer at the point in time illustrated in the top view image 300 in an embodiment, such as is described in box 180 of the bonding energy measurement method 100 in FIG. 1.

Any error in the crack length measurement may lead to large uncertainty in the bonding energy when calculated using the Maszara equation due to the bonding energy being inversely proportional to the crack length to the fourth power. As a result, any error in the crack length measurement is also raised to the fourth power, which significantly compounds the error. By using interferometry to determine the crack end position 430, the bonding energy measurement method of this disclosure may more accurately determine the crack length of a bonded wafer than conventional methods that used by-eye estimates for the crack end position.

The process of determining the crack length and associated bonding energy is performed for each image in the set of images. After, the bonding energy measurement method of this disclosure may then plot the bonding energy as a function of time with the start time determined above used as the start of the plot, such as the plot illustrated in FIG. 5. In other embodiments, the bonding energy measurement method of this disclosure may store the bonding energies as a function of time in a bonding energy array, which may be used similarly.

FIG. 5 is a bonding energy plot 500 illustrating the bonding energy as a function of time for a bonded wafer according to an embodiment. In an embodiment, the bonding energy plot 500 may be the plot described in box 190 of FIG. 1. A bonding energy line 502 illustrates the behavior of the bonding energy over time in an embodiment.

A first timeframe between a start time, to, and a transition time, $t_1$, illustrates the anhydrous behavior of the bonding energy. During the first timeframe, water molecules have not diffused into the crack formed during the bonding energy measurement and has not started stress corrosion of the bonded wafer. As a result, the bonding energy exhibits a constant behavior. Therefore, the bonding energy measured from the first timeframe describes the anhydrous bonding energy of the bonded wafer. Further, because the bonding energy measurement method of this disclosure possesses the resolution to determine the bonding energy behavior during the first timeframe, the bonding energy measurement method of this disclosure is capable of measuring the bonding energy of bonded wafers without using a glove box. The transition time, $t_1$, (as well as the first timeframe) may be about 3-5 seconds and short enough to not have any moisture diffusion into the crack.

A second timeframe, occurring after water molecules have diffused into the crack (after the transition time, $t_1$), illustrates the behavior of the bonding energy of the bonded wafer as a result of stress corrosion. After the transition time, $t_1$, the bonding energy decreases over time as a result of the stress corrosion from the ambient humidity of the environment.

During the bonding process for forming bonded wafers, excess water molecules may become trapped between the wafers being bonded. The bonding energy plot 500 may be used to determine whether moisture is trapped between the wafers of the bonded wafer by monitoring for stress corrosion within the first timeframe. If the bonding energy line 502 is a flat constant line during the first timeframe, there is not excess moisture from the bonding process trapped between the bonded wafers. On the other hand, if the bonding energy line 502 is not flat, but is diminishing the bonding energy during the first timeframe followed by an increase in how rapidly the bonding energy is diminishing in the second timeframe (once the water molecules from the ambient humidity in the environment have diffused into the crack), there was excess moisture from the bonding process trapped between the bonded wafers. In order to measure the bonding energy of bonded wafers, a bonding energy measurement system may be used, such as the system described using FIG. 6.

FIG. 6 is a system diagram of a bonding energy measurement system 600 capable of implementing the bonding energy measurement method of this disclosure in an embodiment. The bonding energy measurement system 600 comprises a light source 602 optically coupled to a first bandpass filter 604, a light diffuser 608 that allows light to pass through and which may be used to support the bonded wafer 200 being tested, and a light detector 618 optically coupled to a lens system 616 which is optically coupled to a second bandpass filter 614. The bonding energy measurement system 600 further comprises a blade inserter 610 to insert the blade 206 into the bonded wafer 200, and a memory 622 electrically coupled to a controller 620 and storing instructions to be executed by the controller 620 to implement the bonding energy measurement method of this disclosure. Similarly labeled elements may be as previously described.

The light source 602 may be any light source capable of generating a light beam comprising a spectrum of known wavelengths that includes the test wavelength used in the bonding energy measurement method of this disclosure. In various embodiments, the light source 602 may be an IR bulb, or a halogen source with a waveguide. In an embodiment, the light beam produced by the light source 602 may comprise wavelengths between about 800 nm and about 1300 nm. For example, the light source 602 may be chosen for the spectrum the light source 602 is capable of producing and how light of that spectrum interacts with the material of the bonded wafer. In an embodiment where the bonded wafer comprises silicon wafers, the silicon of the wafers may block wavelengths not in the infrared spectrum, such that only wavelengths between about 1000 nm and about 6000 nm pass through the bonded wafer. The light beam may then be passed through the first bandpass filter 604 to narrow the spectrum of known wavelengths and produce an incident light beam 606 comprising wavelengths between about 1000 nm and about 1100 nm. In various embodiments, the incident light beam 606 is monochromatic. In other embodiments, the incident light beam 606 comprises a sharply peaked spectrum of wavelengths centered on the test wavelength. The incident light beam 606 may then pass through the light diffuser 608.

The light diffuser 608 may be any material capable of supporting the bonded wafer 200 throughout the bonding energy measurement method and diffusing or scattering the incident light beam 606 to transmit the incident light beam 606 through a large area of the bonded wafer 200, such as frosted acrylic, $CaF_2$, or ZnSe. After passing through the light diffusor 608, the diffused light passes through the bonded wafer 200 and forms a transmitted beam 612.

The blade inserter 610 may be a set of equipment that may be controlled by the controller 620 to insert the blade 206 over the configured distance for forming the crack.

The transmitted beam 612 passes through the second bandpass filter 614 to further narrow the spectrum of the transmitted beam 612 to filter out ambient white light and to form a filtered transmitted beam, and the light detector 618 collects the filtered transmitted beam using the lens system 616. The light detector 618 may be any device capable of recording video which may be used to monitor the variation in light intensity of the filtered transmitted beam across the surface of the bonded wafer 200 at the test wavelength of the bonding energy measurement method. In various embodiments, the lens system 616 may be a lens, or a plurality of lenses capable of magnifying the filtered transmitted beam and enabling the light detector 618 to record the image and associated light intensity of the filtered transmitted beams.

The controller 620 may be any device capable of implementing the instructions stored in the memory 622 for controlling and operating the bonding energy measurement system 600 to implement the bonding energy measurement method of this disclosure (such as the method 100 in FIG. 1). Further, the controller 620 may comprise processors for calculating the bonding energy according to the measured crack length for the bonded wafer 200. The memory 622 may be any device suitable for storing instructions to be executed by the controller 620. Further, the memory 622 may be any device suitable for storing the data collected by the light detector 618 (e.g., images, video, light intensity plots, bonding energy plot), and storing the instructions, such as RAM, ROM, PROM, EPROM, EEPROM, hard disk, or any other information processing device with which the controller 620 communicates, such as a server or computer.

Figure 7:
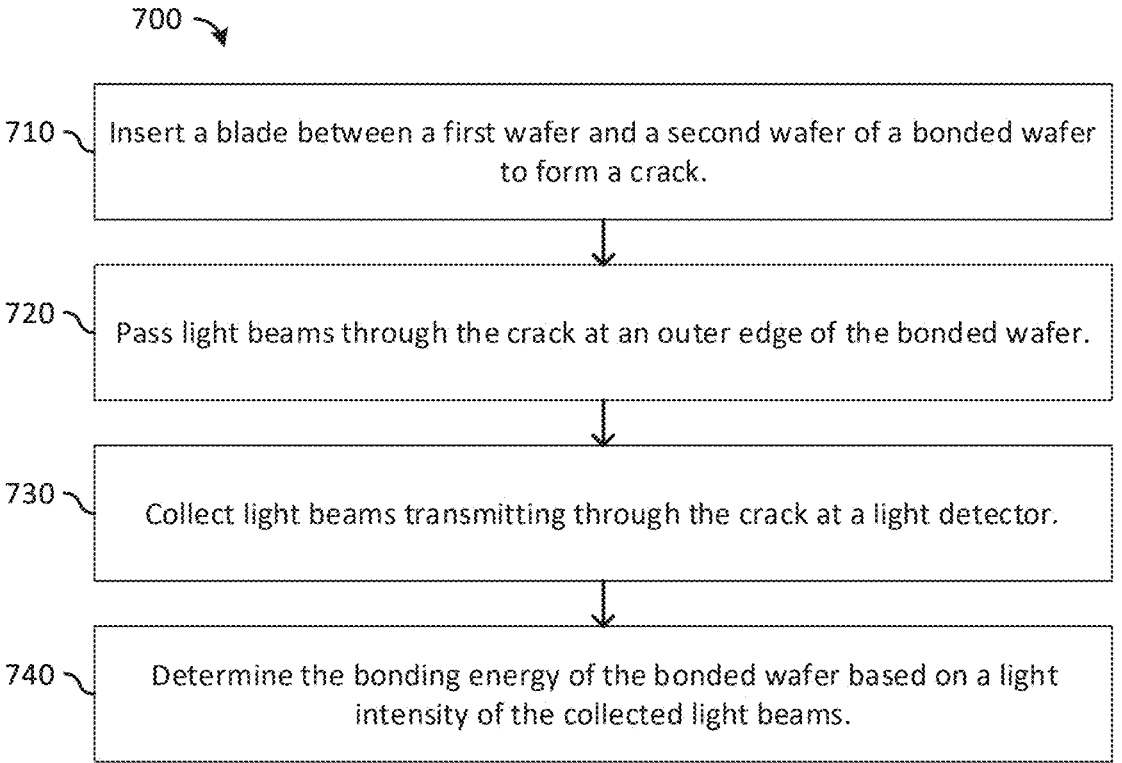
FIG. 7 is a flowchart of a bonding energy measurement method of this disclosure according to an embodiment.

FIGS. 7-8 illustrate example methods of a bonding energy measurement method in accordance with embodiments of this disclosure. The methods of FIGS. 7-8 may be combined with other methods and performed using the systems and apparatuses as described herein. For example, the methods of FIGS. 7-8 may be combined with any of the embodiments of FIG. 1, FIGS. 2A-2C, FIGS. 3-4 and FIG. 5. Further, in an embodiment, the methods of FIGS. 7-8 may be implemented by the bonding energy measurement system 600 of FIG. 6. Although shown in a logical order, the arrangement and numbering of the steps of FIGS. 7-8 are not intended to be limited.

Referring to FIG. 7, step 710 of a method 700 of determining the bonding energy of a bonded wafer inserts a blade between a first wafer and a second wafer of the bonded wafer to form a crack. The bonded wafer comprises the first wafer bonded to the second wafer by any wafer bonding method known in the art. For example, step 710 may be the same step as the box 120 illustrated in the flowchart of FIG. 1. Further, the step 710 may be illustrated by the FIG. 2B, where the blade 206 has been inserted into the bonded wafer 200.

Still referring to FIG. 7, step 720 of the method 700 passes light beams through the crack at an outer edge of the bonded wafer. The light beams form an interference pattern, and the light beams may be produced using a light source suitable for producing the light beams of a spectrum of wavelengths capable of transmitting through the bonded wafer. The step 720 may be the same step as the box 110 of the bonding energy measurement method 100 of FIG. 1. The method 700 then collects light beams transmitting through the crack at a light detector in step 730. The light detector in step 730 may be any light detector suitable for collecting the light beams after transmitting through the bonded wafer, such as a CMOS camera. For example, in an embodiment, the light detector of step 730 may be the light detector 618 of the bonding energy measurement system 600 of FIG. 6.

After collecting the light beams in step 730, the method 700 proceeds to step 740. In step 740, the method 700 determines the bonding energy of the bonded wafer based on a light intensity of the collected light beams. For example, in an embodiment, the light intensity may be the intensity plot 320 of FIG. 3. In an embodiment, the step 740 of the method 700 may be the steps described in box 180 of the bonding energy measurement method 100 of FIG. 1.

Now referring to FIG. 8, step 810 of a method 800 exposes a bonded wafer to a light beam, the bonded wafer comprising a first wafer bonded with a second wafer through any conventional wafer bonding method known in the art. In an embodiment, the bonded wafer may be the bonded wafer

200 illustrated in FIG. 2A. Step 820 of the method 800 records a video of the bonded wafer using a light detector, the light detector collecting the light beam after passing through the bonded wafer. The video may be recorded over a timeframe.

Still referring to FIG. 8, step 830 of the method 800 inserts a blade to form a crack between the first wafer and the second wafer of the bonded wafer during the timeframe (the crack splitting the bonded wafer into an unbonded region and a bonded region). The light beam forms an interference pattern after passing through the bonded wafer. In an embodiment, step 830 may be illustrated by the bonded wafer 200 of FIG. 2B after inserting the blade 206. Similarly, the step 830 may be the steps described in box 120 of the bonding energy measurement method 100 of FIG. 1. In an embodiment, the interference pattern of step 830 may be illustrated by the interference pattern 304 of the image 300 of FIG. 3. In step 840, the method 800 generates a light intensity function comprising a light intensity as a function of position for each image of a set of images from the video. For example, the light intensity function may be illustrated by the light intensity plot 320 of FIG. 3.

After, the method 800 proceeds to step 850. In step 850, the method 800 determines, using a peak finding algorithm on the light intensity function, a crack length for each image of the set of images, and calculates, using the crack length, a bonding energy for each image of the set of images. For example, the crack length may be determined using the displacement plot 400 illustrated and described using FIG. 4. In an embodiment, the bonding energies over the timeframe of the video may be used to form a bonding energy array, which may be illustrated as the bonding energy plot 500 of FIG. 5. In various embodiments, the bonding energy array may then be used to determine the anhydrous bonding energy, and whether excess moisture was present between the first wafer and the second wafer leftover from the bonding method used to form the bonded wafer.

Example embodiments of the invention are described below. Other embodiments can also be understood from the entirety of the specification as well as the claims filed herein.

Example 1. A method of determining a bonding energy of a bonded wafer includes receiving the bonded wafer including a first wafer bonded with a second wafer, and inserting a blade between the first wafer and the second wafer to form a crack between the first wafer and the second wafer, the crack extending from a portion of the blade contacting the first wafer and the second wafer to a point where the first wafer and the second wafer are still bonded. The method further includes passing light beams through the crack at an outer edge of the bonded wafer, and collecting light beams transmitting through the crack at a light detector. And the method further includes determining the bonding energy of the bonded wafer based on a light intensity of the collected light beams.

Example 2. The method of example 1, where the light beams include a wavelength between about 1000 nm to about 1100 nm, the first wafer includes a silicon wafer, and the second wafer includes a silicon wafer.

Example 3. The method of one of examples 1 or 2, where determining the bonding energy includes calculating the bonding energy ($E_b$) as follows $$E_b = \frac{3(t_{blade})^2 E_1 (t_{wafer,1})^3 E_2 (t_{wafer,2})^3}{16(l_{crack})^4 \left[ E_1 (t_{wafer,1})^3 + E_2 (t_{wafer,2})^3 \right]},$$

where $E_1$ is the Effective Young's modulus of the first wafer, $t_{wafer,\ 1}$ is the thickness of the first wafer, $E_2$ is the Effective Young's modulus of the second wafer, $t_{wafer,2}$ is the thickness of the second wafer, $t_{blade}$ is the thickness of the blade, and $l_{crack}$ is the length of the crack in the bonded wafer.

Example 4. The method of one of examples 1 to 3, where determining the bonding energy includes determining a length of the crack using a peak finding algorithm.

Example 5. The method of one of examples 1 to 4, where determining the length of the crack includes determining a crack end point based on the wavelengths of the collected light beams and an interference pattern formed from the light intensity of the collected light beams to obtain the length of the crack.

Example 6. The method of one of examples 1 to 5, where determining the length of the crack includes determining positions of the light fringes and dark fringes of an interference pattern formed from the light intensity of the collected light beams, the positions corresponding to different radial distances from a center of the bonded wafer. Determining the length of the crack further includes determining displacements between the first and the second wafer based on the positions of the light fringes and dark fringes and the wavelengths of the collected light beams, each displacement corresponding to a gap distance between the first wafer and the second wafer. And determining the length of the crack further includes determining a crack end point based on the displacements and the positions to obtain the length of the crack.

Example 7. The method of one of examples 1 to 6, further includes holding the blade in a stationary position to prevent further inserting between the first wafer and the second wafer. The method further includes while holding the blade, repeating the passing, the collecting, the determining of the bonding energy for a predetermined number of cycles to obtain a bonding energy array including a series of bonding energies as a function of elapsed time. And the method further includes determining a metric of the bonding process based on the bonding energy array.

Example 8. The method of one of examples 1 to 7, where the metric of the bonding process includes a presence of moisture at a bond interface between the first wafer and the second wafer in the bonded wafer.

Example 9. The method of one of examples 1 to 8, further includes determining an anhydrous bonding energy of the bonded wafer based on values of the bonding energies of the bonding energy array over a subset of elapsed times while ignoring values of the bonding energies over remaining subset of the elapsed times during which the bonding energies are decreasing.

Example 10. The method of one of examples 1 to 9, further includes determining a start time when the blade stops moving after the inserting and determining an anhydrous bonding energy of the bonded wafer based on values of the bonding energies in the bonding energy array with elapsed times less than 3 seconds from the start time when the blade stops moving after the inserting.

Example 11. A method of determining a bonding energy of a bonded wafer includes exposing the bonded wafer to a light beam, the bonded wafer including a first wafer bonded with a second wafer, and recording a video of the bonded wafer using a light detector, the light detector collecting the light beam after passing through the bonded wafer, the video being recorded over a timeframe. The method further includes inserting a blade to form a crack between the first wafer and the second wafer of the bonded wafer during the timeframe, where the crack splits the bonded wafer into an unbonded region and a bonded region, and generating a light intensity function including a light intensity as a function of position for each image of a set of images from the video. And the method further includes determining, using a peak finding algorithm on the light intensity function, a crack length for each image of the set of images, and calculating, using the crack length, a bonding energy for each image of the set of images.

Example 12. The method of example 11, further includes forming a bonding energy array including the bonding energies as a function of time.

Example 13. The method of one of examples 11 or 12, further includes determining an anhydrous bonding energy of the bonded wafer using the bonding energies of the bonding energy array.

Example 14. The method of one of examples 11 to 13, further includes determining a start time when the blade stops moving after the inserting and determining an anhydrous bonding energy, the determining includes calculating a bonding energy representative of the bonding energies as a function of time for times less than 3 seconds from the start time when the blade stops moving after the inserting.

Example 15. The method of one of examples 11 to 14, further includes determining whether excess moisture is present between the first wafer and the second wafer of the bonded wafer using the bonding energies of the bonding energy array.

Example 16. The method of one of examples 11 to 15, wherein each image corresponds to a time within the timeframe of the video, and where a start time of the bonding energy array includes determining a time when a position of the blade in a present image of the set of images is the same as a position of the blade in the last image of the set of images.

Example 17. The method of one of examples 11 to 16, where the light beam includes a wavelength between about 1000 nm to about 1100 nm.

Example 18. A system for determining a bonding energy of a bonded wafer includes a light source optically coupled to a light diffuser configured to support a bonded wafer, the bonded wafer including a first wafer bonded with a second wafer, a blade inserter to insert a blade in the bonded wafer, and a light detector. And the system further includes a controller operationally coupled to the light source, the blade inserter, the light detector, and coupled to a memory storing a program to be executed in the controller, the program including instructions to insert the blade between the first wafer and the second wafer to form a crack between the first wafer and the second wafer, the crack extending from a portion of the blade contacting the first wafer and the second wafer to a point where the first wafer and the second wafer are still bonded, pass light beams through the crack at an outer edge of the bonded wafer, collect light beams transmitting through the crack at the light detector, and determine the bonding energy of the bonded wafer based on a light intensity of the collected light beams.

Example 19. The system of example 18, where the light detector includes a CMOS camera, and the light source includes a halogen source optically coupled with a waveguide.

Example 20. The system of one of examples 18 or 19, where the light detector includes a CMOS camera, and the light source includes an infrared (IR) bulb.

Example 21. The system of one of examples 18 to 20, where the blade includes a razor blade with a bevel and the portion of the blade contacting the first wafer and the second wafer includes the start of the bevel of the razor blade.

Example 22. The system of one of examples 18 to 21, further includes a first bandpass filter configured to filter the light beams from the light source before the light beams enter the light diffuser, and a second bandpass filter configured to filter the light beams after transmitting through the bonded wafer and before reaching the light detector.

Example 23. The system of one of examples 18 to 22, where the first wafer includes a silicon wafer and the second wafer includes a silicon wafer.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of determining a bonding energy of a bonded wafer, the method comprising:

receiving the bonded wafer comprising a first wafer bonded with a second wafer;

inserting a blade between the first wafer and the second wafer to form a crack between the first wafer and the second wafer, the crack extending from a portion of the blade contacting the first wafer and the second wafer to a point where the first wafer and the second wafer are still bonded;

passing light beams through the crack at an outer edge of the bonded wafer;

collecting light beams transmitting through the crack at a light detector;

determining the bonding energy of the bonded wafer based on a light intensity of the collected light beams; and determining whether excess moisture is present between the first wafer and the second wafer of the bonded wafer based on the bonding energy.

2. The method of claim 1, wherein the light beams comprise a wavelength between about 1000 nm to about 1100 nm, the first wafer comprises a silicon wafer, and the second wafer comprises a silicon wafer.

3. The method of claim 1, wherein determining the bonding energy comprises calculating the bonding energy $(E_b)$ as follows $$E_b = \frac{3(t_{blade})^2 E_1 (t_{wafer,1})^3 E_2 (t_{wafer,2})^3}{16(l_{crack})^4 \left[ E_1 (t_{wafer,1})^3 + E_2 (t_{wafer,2})^3 \right]},$$

wherein $E_1$ is the Effective Young's modulus of the first wafer, $t_{wafer,1}$ is the thickness of the first wafer, $E_2$ is the Effective Young's modulus of the second wafer, $t_{wafer,2}$ is the thickness of the second wafer, $t_{blade}$ is the thickness of the blade, and $l_{crack}$ is the length of the crack in the bonded wafer.

4. The method of claim 1, wherein determining the bonding energy comprises determining a length of the crack using a peak finding algorithm.

5. The method of claim 4, wherein determining the length of the crack comprises:

determining a crack end point based on the wavelengths of the collected light beams and an interference pattern formed from the light intensity of the collected light beams to obtain the length of the crack.

6. The method of claim 4, wherein determining the length of the crack comprises:

determining positions of the light fringes and dark fringes of an interference pattern formed from the light intensity of the collected light beams, the positions corresponding to different radial distances from a center of the bonded wafer;

determining displacements between the first and the second wafer based on the positions of the light fringes and dark fringes and the wavelengths of the collected light beams, each displacement corresponding to a gap distance between the first wafer and the second wafer; and determining a crack end point based on the displacements and the positions to obtain the length of the crack.

7. The method of claim 1, further comprising:

holding the blade in a stationary position to prevent further inserting between the first wafer and the second wafer;

while holding the blade, repeating the passing, the collecting, the determining of the bonding energy for a predetermined number of cycles to obtain a bonding energy array comprising a series of bonding energies as a function of elapsed time; and determining a metric of the bonded wafer based on the bonding energy array.

8. The method of claim 7, wherein the metric of the bonded wafer comprises a presence of moisture at a bond interface between the first wafer and the second wafer in the bonded wafer.

9. The method of claim 7, further comprising:

determining an anhydrous bonding energy of the bonded wafer based on values of the bonding energies of the bonding energy array over a subset of elapsed times while ignoring values of the bonding energies over remaining subset of the elapsed times during which the bonding energies are decreasing.

10. The method of claim 7, further comprising:

determining an anhydrous bonding energy of the bonded wafer based on values of the bonding energies in the bonding energy array with elapsed times less than 3 seconds from a start time when the blade stops moving after the inserting.

11. A method of determining a bonding energy of a bonded wafer, the method comprising:

exposing the bonded wafer to a light beam, the bonded wafer comprising a first wafer bonded with a second wafer;

recording a video of the bonded wafer using a light detector, the light detector collecting the light beam after passing through the bonded wafer, the video being recorded over a timeframe;

inserting a blade to form a crack between the first wafer and the second wafer of the bonded wafer during the timeframe, wherein the crack splits the bonded wafer into an unbonded region and a bonded region;

generating a light intensity function comprising a light intensity as a function of a position for each image of a set of images from the video;

determining, using a peak finding algorithm on the light intensity function, a crack length for each image of the set of images, and calculating, using the crack length, a bonding energy for each image of the set of images; and determining whether excess moisture is present between the first wafer and the second wafer of the bonded wafer based on the bonding energy.

12. The method of claim 11, further comprising:

forming a bonding energy array comprising the bonding energies as a function of time.

13. The method of claim 12, further comprising:

determining an anhydrous bonding energy of the bonded wafer using the bonding energies of the bonding energy array.

14. The method of claim 12, wherein:

determining whether excess moisture is present between the first wafer and the second wafer of the bonded wafer comprises using the bonding energies of the bonding energy array.

15. The method of claim 12, wherein each image corresponds to a time within the timeframe of the video, and wherein a start time of the bonding energy array comprises determining a time when a position of the blade in a present image of the set of images is the same as a position of the blade in the last image of the set of images.

16. The method of claim 11, further comprising determining an anhydrous bonding energy, the determining comprising calculating a bonding energy representative of the bonding energies as a function of time for times less than 3 seconds from a start time when the blade stops moving after the inserting.

17. A system for determining a bonding energy of a bonded wafer, the system comprising:

a light source optically coupled to a light diffuser configured to support a bonded wafer, the bonded wafer comprising a first wafer bonded with a second wafer;

a blade inserter to insert a blade in the bonded wafer;

a light detector; and a controller operationally coupled to the light source, the blade inserter, the light detector, and coupled to a memory storing a program to be executed in the controller, the program comprising instructions to insert the blade between the first wafer and the second wafer to form a crack between the first wafer and the second wafer, the crack extending from a portion of the blade contacting the first wafer and the second wafer to a point where the first wafer and the second wafer are still bonded, pass light beams through the crack at an outer edge of the bonded wafer, collect light beams transmitting through the crack at the light detector, determine the bonding energy of the bonded wafer based on a light intensity of the collected light beams, and determine whether excess moisture is present between the first wafer and the second wafer of the bonded wafer based on the bonding energy.

18. The system of claim 17, wherein the light detector comprises a CMOS camera, and the light source comprises a halogen source optically coupled with a waveguide or an infrared (IR) bulb.

19. The system of claim 17, wherein the blade comprises a razor blade with a bevel and the portion of the blade contacting the first wafer and the second wafer comprises the start of the bevel of the razor blade.

20. The system of claim 17, further comprising:

a first bandpass filter configured to filter the light beams from the light source before the light beams enter the light diffuser; and a second bandpass filter configured to filter the light beams after transmitting through the bonded wafer and before reaching the light detector.

\* \* \* \* \*